Oct. 6, 1959 A. L. LEE 2,907,227
MINE HAULAGE VEHICLE
Original Filed Aug. 31, 1951 5 Sheets-Sheet 1
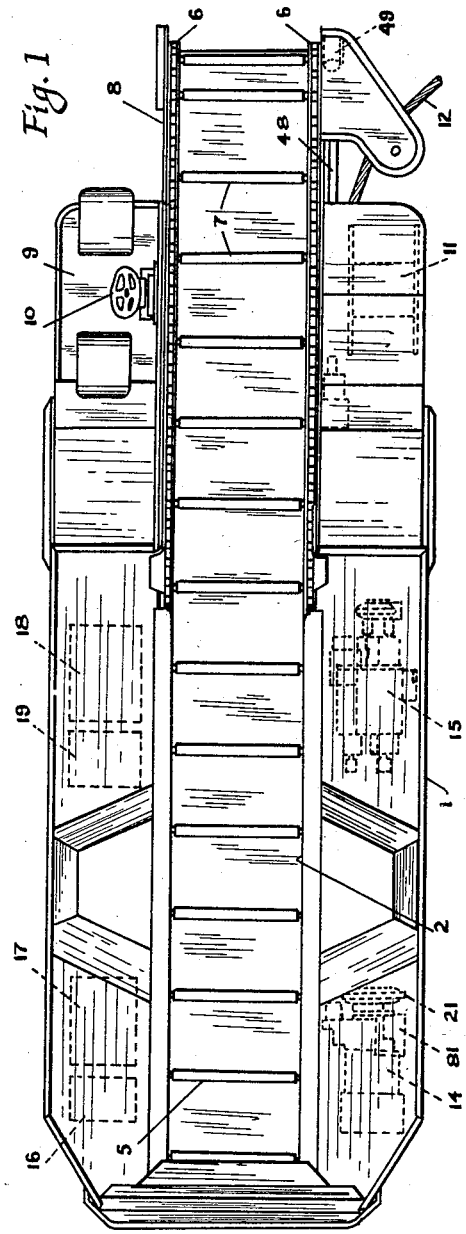
INVENTOR.
Arthur L. Lee
BY Stanley J Price
ATTORNEY

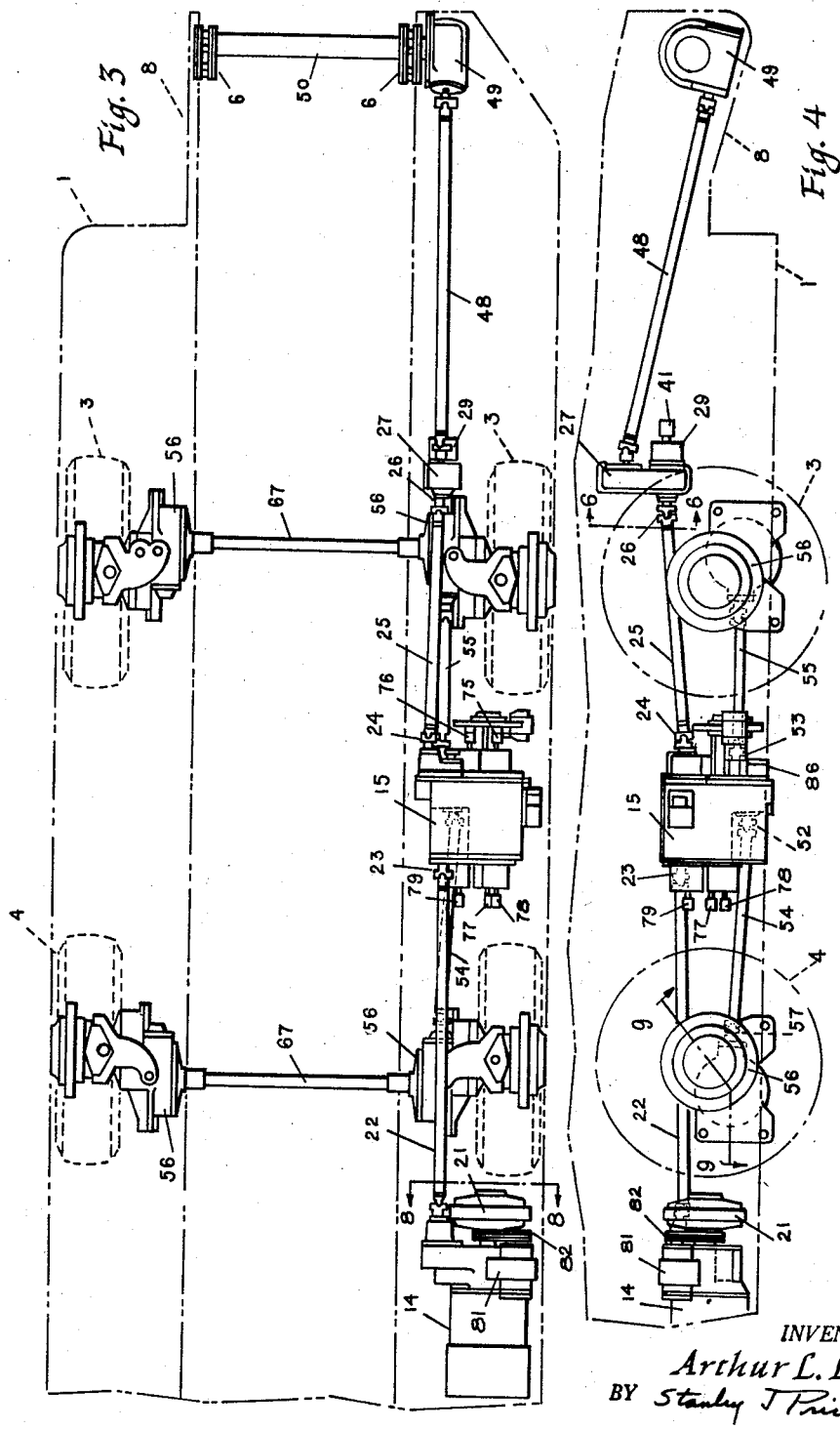

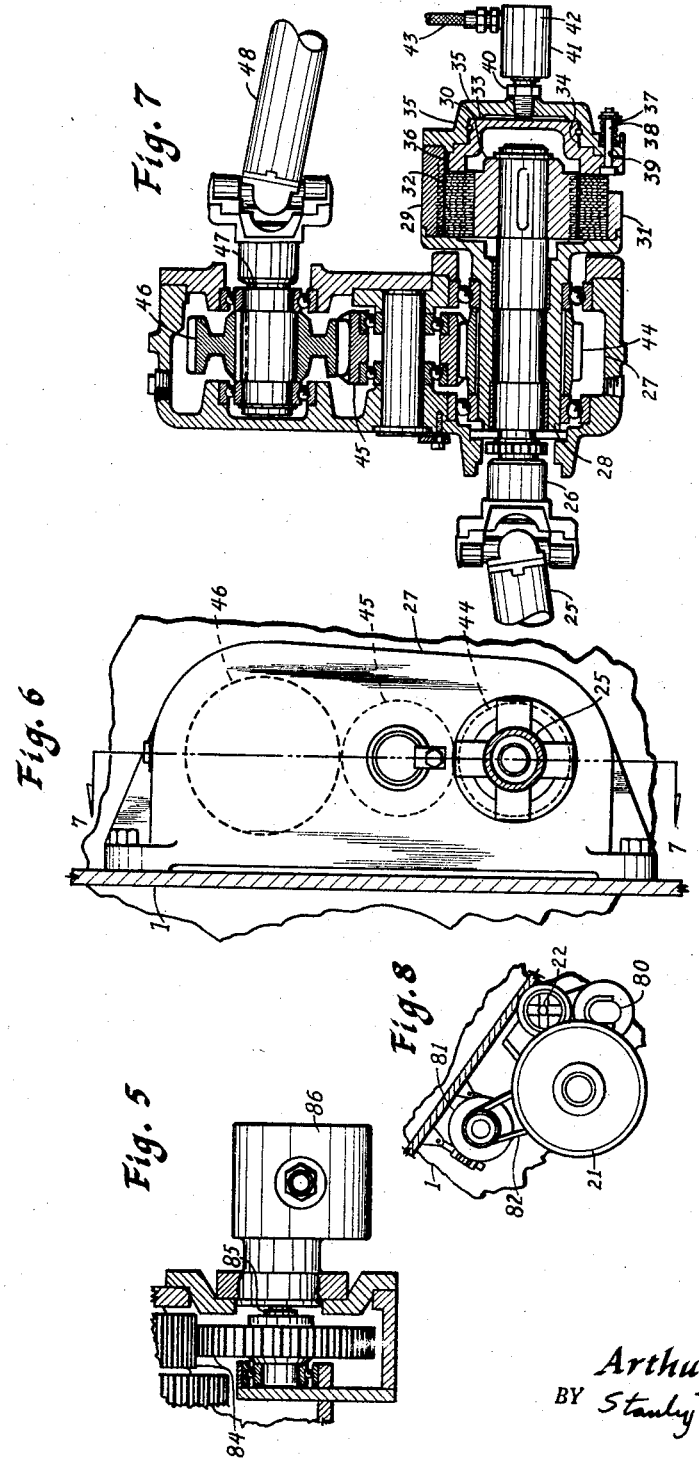

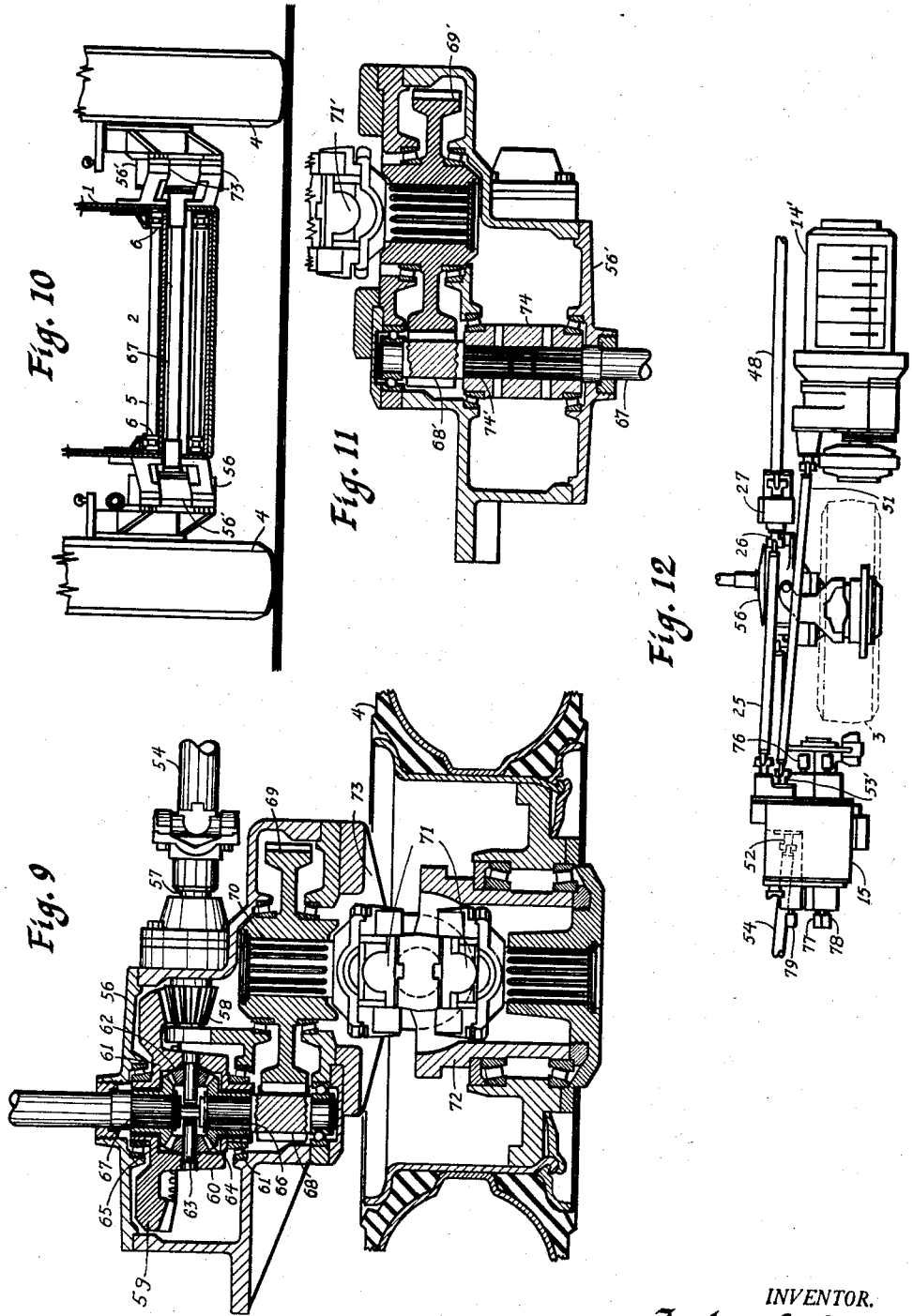

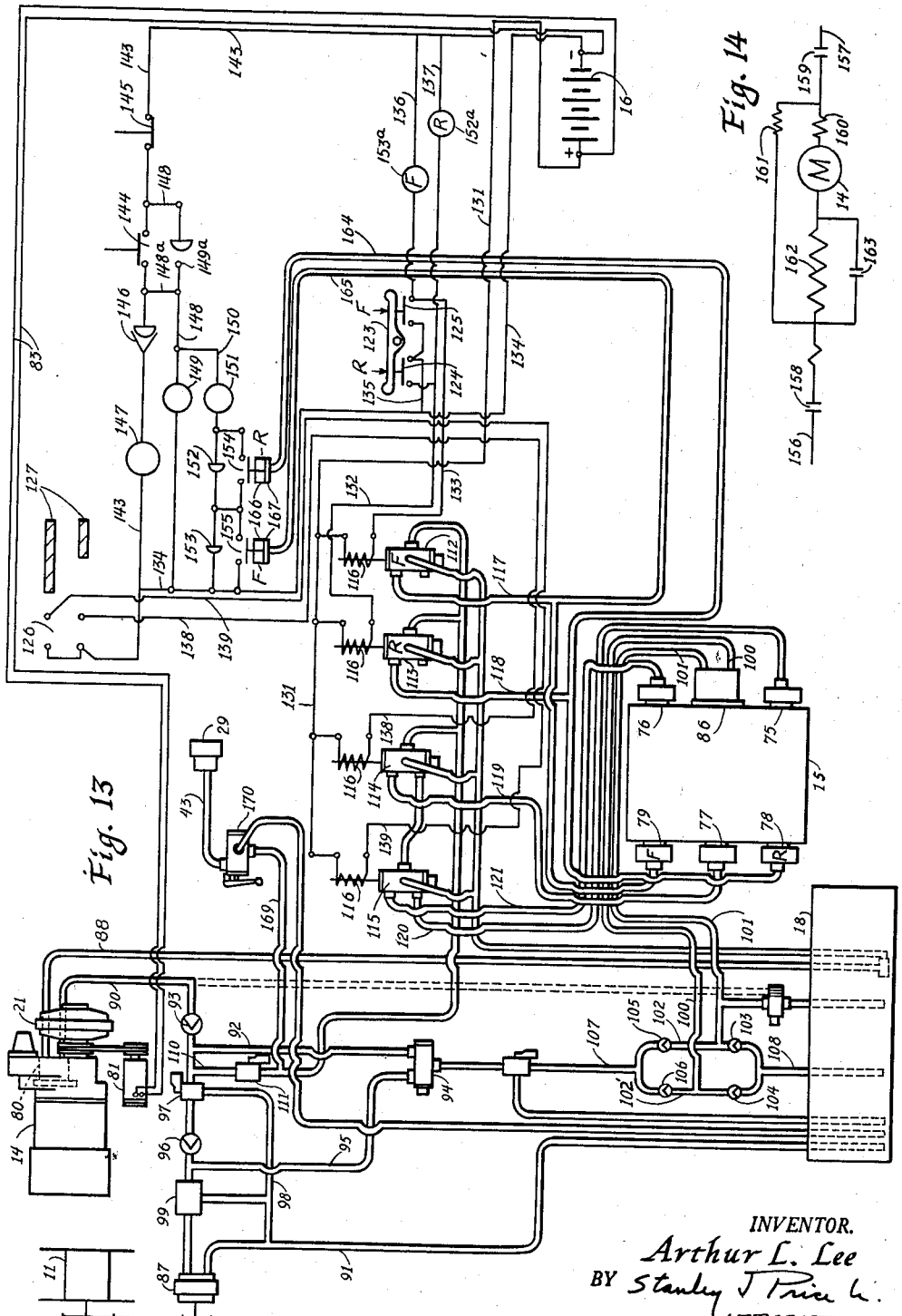

United States Patent Office 2,907,227
Patented Oct. 6, 1959

2,907,227

MINE HAULAGE VEHICLE

Arthur L. Lee, Columbus, Ohio, assignor to Consolidation Coal Company, a corporation of Pennsylvania Original application August 31, 1951, Serial No. 244,549, now Patent No. 2,754,015, dated July 10, 1956. Divided and this application September 22, 1955, Serial No. 535,855

8 Claims. (Cl. 74—472)

This invention relates to automotive vehicles and more particularly to a mine haulage vehicle of the type commonly known as a "shuttle car" especially designed for use in hauling loose material in underground mines.

The present application is a division of my copending application Serial No. 244,549 filed August 31, 1951, now Patent No. 2,754,015, dated July 10, 1956, and assigned to the assignee of the present invention.

An object of the present invention is to provide an improved automotive vehicle. Another object is to provide an improved mine haulage vehicle of the type commonly known as a "shuttle car" having novel features of construction. A further object is to provide an improved automotive vehicle having propelling and steering means such as traction and steering wheels and improved driving means therefor. A still further object is to provide an improved automotive vehicle which has improved propelling means adapted to be driven by alternate sources of power such as A.C. or D.C. electric motors or a diesel engine. Yet another object is to provide an improved mine haulage vehicle having certain of its elements operated by liquid under pressure and having novel means associated therewith for generating liquid under pressure. A further object is to provide an auxiliary pump operating only when the vehicle is traveling and driven by the vehicle wheels whereby a supplemental source of liquid under pressure may be provided while the vehicle is in motion and the liquid pressure demand is greater. A still further object is to provide improved liquid pressure generating means whereby a relatively small volume of liquid may be provided while the vehicle is stationary and a supplemental supply of liquid under pressure is made available while the vehicle is traveling and the liquid pressure demands are relatively high, thereby eliminating the need of by-passing a relatively large volume of liquid, with its inherent power losses, while the vehicle is stationary and when only a relatively small volume of liquid pressure is needed. Another object is to provide an improved hydraulic and electric systems for such a vehicle. A further object is to provide an improved electrical control system for an electrically driven "shuttle car." These and other objects and advantages of the invention will, however, hereinafter more fully appear.

In the accompanying drawings there is shown for purposes of illustration one form which the invention may assume in practice.

In these drawings:

Fig. 1 is a plan view and Fig. 2 is a side elevational view of a mine haulage vehicle in which a preferred illustrative form of the invention is embodied.

Fig. 3 is a somewhat schematic view with the vehicle body in outline and showing portions of the driving means for the traction wheels and the conveyor.

Fig. 4 is a schematic side view, similar to Fig. 3, showing the vehicle in side elevation.

Fig. 5 is an enlarged detail section taken through the auxiliary pump driven through the vehicle-transmission.

Fig. 6 is an enlarged detail transverse vertical section taken on line 6—6 of Fig. 4, showing a portion of the conveyor drive.

Fig. 7 is a detail longitudinal vertical section taken on line 7—7 of Fig. 6.

Fig. 8 is a detail transverse vertical section taken on line 8—8 of Fig. 3, showing a portion of the drive.

Fig. 9 is an enlarged developed section taken substantially on the planes of line 9—9 of Fig. 4, showing details of the drive for one of the traction wheels.

Fig. 10 is an enlarged fragmentary cross section taken on line 10—10 of Fig. 2.

Fig. 11 is a detail section taken on the plane of Fig. 9, showing the drive for an opposite traction wheel.

Fig. 12 is a fragmentary view of a portion of the structure shown in Fig. 3, illustrating the connection with an alternate power source.

Fig. 13 is a diagrammatic view illustrating the hydraulic and electric systems.

Fig. 14 is a diagrammatic view illustrating the electrical control system for the electric motor.

The several features of the invention, as shown in the drawings, are embodied in a mine haulage vehicle of the kind commonly known as a "shuttle car" especially designed for use in transferring loose material in underground mines, and while such features are especially adapted to use with such a vehicle they are also adapted to use with automotive vehicles of other types.

The mine haulage vehicle disclosed herein generally comprises a body 1 having a material receiving compartment 2 and mounted on pairs of front and rear traction and steering wheels 3 and 4, with the compartment 2 extending longitudinally between the wheels in the manner shown in Figs. 1 and 10. Extending along the bottom of the compartment is a conventional endless flight conveyor 5 having endless side chains 6 suitably guided within guideways within the body and to which usual cross flights 7 are connected. The discharge end of the conveyor extends along a tiltable end frame 8 which is tiltable to effect variation in the discharge height of the conveyor. Arranged at one side of the discharge end of the vehicle body is a compartment 9 which provides a station for the operator and which has therein a steering wheel 10 and other conveniently arranged controls whereby the vehicle may be operated and steered. Arranged at the opposite side of the discharge end of the body is a conventional electric cable reel 11 on which a power conductor cable 12 is wound, and the tiltable end frame 8 carries suitable guides 13 for the cable, whereby the latter may be extended in various directions from the vehicle into connection with a suitable source of electric power such as a main power line. Arranged at one side of the opposite end of the body is an electric motor 14 which may be either of the A.C. or D.C. type. Arranged at the same side of the body, between the front and rear wheels, is a selective multispeed automotive transmission 15. Located at the side of the body opposite from the motor 14 is a storage battery 16 and an electric control apparatus 17, while arranged between the front and rear wheels at this side of the body is a liquid tank 18 and a control valve apparatus 19, both associated with the selective multi-speed transmission 15 as later explained. In the event a diesel engine is employed in lieu of the electric motor 14, the cable reel 11 may be omitted and the diesel engine may be placed in the space previously occupied by the cable reel. A fuel tank for the diesel engine is substituted for the electric control apparatus 17, in the space provided.

Now referring to the conveyor and wheel drives of the vehicle it will be noted that the motor 14 is connected through a coupling or clutch 21 to a universal shafting 22 extending longitudinally within the body at one side of the compartment and this shafting is, in turn, connected to the input shaft 23 of the selective transmission. An output shaft 24 of the transmission is connected by universal shafting 25 to a shaft 26 (see Fig. 7) of a reduction gearing contained in a housing 27 suitably mounted on the adjacent side of the vehicle body. As illustrated, the shaft 26 is arranged coaxial with and is journaled centrally within a hollow shaft 28 which is suitably journaled within the gear housing 27. The hollow shaft 28 is connectible to the inner shaft 26 by a friction clutch 29 which includes an inner member 30 keyed to the inner shaft and an outer rotatable casing 31 secured to the outer hollow shaft. The member 30 and the casing 31 carry interleaved clutch discs or plates 32 which, when pressed together, serve frictionally to connect the shafts for rotation in unison. An annular piston 33 is received in a cylinder bore 34 formed within an end closure 35 of the rotatable casing, and this piston is secured to a clutch operating element 36, as illustrated. The clutch operating element is normally held retracted by coil springs 37 which act on bolts 38 passing through openings 39 in the casing and engaging the clutch operating element. The end closure 35 has an element 40 of a conventional fluid swivel 41 connected thereto, and an outer element 42 of the swivel is coupled to a fluid conduit 43. Thus, liquid under pressure may flow through the conduit 43 and through the swivel to the cylinder bore 34 to act on the piston 33 of the clutch operating element 36 to move the latter inwardly against the action of the springs 37 to effect loading of the clutch discs. When the cylinder bore is suitably vented the springs may retract the operating element 36 to release the clutch.

Secured to the outer shaft 28 is a spur gear 44 meshing with a spur gear 45 which in turn meshes with and drives a spur gear 46 secured to a parallel shaft 47 likewise suitably journaled in the housing 27. This shaft is connected by universal drive shafting 48 to a conventional speed reducer 49 which drives a cross shaft 50 suitably journaled within the tiltable end frame 8. Chain sprockets suitably secured to this cross shaft engage and drive the endless side chains 6 of the conveyor. The universal shafting 48 permits tilting of the end frame 8 of the vehicle, to adjust the discharge end of the conveyor, while maintaining the drive. When a diesel engine is employed, as designated at 14' in Figure 12, it is connected by universal shafting 51 to an input shaft 53' of the transmission.

Output shafts 52 and 53 are driven by the terminal element of the selective transmission 15 and are connected by oppositely extending universal drive shaftings 54 and 55 respectively, to gear housings 56 arranged at one side of the vehicle body, as shown in Fig. 3. These gear housings are suitably rigidly secured to the adjacent side of the vehicle body and each includes, as shown in Fig. 9, a drive shaft 57 having a beveled pinion 58 secured thereto and meshing with and driving a beveled gear 59, the latter, in turn, secured to a differential housing 60 having hub portions 61 suitably journaled within the gear housing. Beveled planet gears 62 of the differential are journaled on radial shafts 63 suitably supported within the differential housing and meshing with coaxial beveled gears 64 and 65 suitably journaled within the hub portions of the differential housing 60 (Fig. 9). These beveled gears 64 and 65 are keyed to the adjacent ends of aligned horizontal shafts 66 and 67 respectively, and the shaft 66 is suitably journaled within the gear housing 56 and has secured thereto a spur pinion 68 meshing with a spur gear 69 having its hub journaled within the gear housing 56 and keyed to a parallel shaft 70. The shaft 70 drives through a conventional universal joint structure 71 the hub 72 of the adjacent wheel. The wheel is mounted in a known manner on brackets 73 secured to the adjacent side of the vehicle body and these brackets provide an upright pivotal mounting, in alignment with the universal joint structure, whereby the wheel may be turned horizontally in the usual manner to effect steering. The steering gear connected to each traction wheel is conventional and is herein purposely omitted to facilitate illustration.

As shown in Fig. 10, the aligned cross shaft 67 extends transversely of the lower portion of the vehicle body beneath the bottom of the compartment and is arranged intermediate the upper and lower runs of the conveyor, and is suitably journaled in a gear housing 56' arranged at the opposite side of the body. This housing is similar to the housing 56, but, in this instance, the differential is omitted so that a pair of wheels is driven through a differential located at one side of the vehicle body. The shaft 67 is coupled at 74 to an aligned shaft 74' suitably journaled within the gear housing 56' (see Fig. 11), and secured to the shaft 74' is a spur pinion 68' meshing with a spur gear 69' likewise having its hub journaled within the gear housing 56' and similarly connected through a universal joint structure 71' to the adjacent traction wheel. The other pair of wheels is mounted and driven in an identical manner.

From the foregoing description, it will be evident that the pairs of front and rear wheels 3 and 4 may be concurrently driven and turned horizontally in unison about their swivel mountings, to effect propulsion and steering of the vehicle, and may be driven selectively at different predetermined speeds and in either direction at any speed through the selective transmission 15 while the electric motor 14 may run at a constant speed. Of course when an A.C. motor or a diesel engine is employed, a variable speed drive may also be effected by conventional appropriate control of the motor or engine as desired. It will be noted that the selective transmission 15 is arranged in a relatively low position on the vehicle body down between the front and rear wheels at one side of the body, in such manner as to provide direct drives with the wheels as well as to provide an extremely compact arrangement. The selective transmission 15 may include selective speed controlling clutches 75, 76 and 77 and forward and reverse clutches 79 and 78 respectively; each clutch having a hydraulic operator in the manner of the conveyor drive clutch above described in detail. Since this transmission may assume any approprate form and does not per se enter into the present invention, further detail description thereof is herein considered unnecessary.

Driven by the motor 14 through the coupling or clutch 21 is a conventional fluid pump 80 and an electric generator 81, the latter being driven through a suitable belt and pulley connection 82 (see Fig. 8). This generator is connected by electric wiring 83 to the storage battery 16, as shown diagrammatically in Fig. 13 whereby charging of the battery may be effected. Also driven through an element of the selective transmission 15, through spur gearing 84 (Fig. 5) is a shaft 85 of an auxiliary fluid pump 86. The cable reel 11 is driven by a conventional hydraulic motor 87, and this motor may be operated in a known manner to drive the cable reel in a direction to wind in the power conductor cable 12 either when the vehicle is traveling or stationary, and may operate to cause the cable reel to rotate in unwinding direction with a predetermined resistance to rotation so as to maintain the conductor cable under the proper tension. The pump 80 is driven whenever the motor 14 (or the diesel engine) is operating and the pump 86 is driven through the transmission only when the vehicle is traveling so that, in effect, this pump is driven by the traction wheels. The pump 80 has its suction side connected by a conduit 88 to the liquid tank 18, and the discharge side of the pump is connected by conduit 90 to the intake side of the reel motor 87. The discharge side of the reel motor is connected by a return conduit 91 back to the tank 18. A branch conduit 92 leads from the conduit 90, beyond a check valve 93, to a valve device 94, and a conduit 95 leads from this valve device back to the conduit 90, beyond a check valve 96. A relief valve 97, located in the conduit 90 between the check valves 93 and 96, is connected by a relief conduit 98 back to the return conduit 91. Thus, when the motor 14 is running the pump 80 may supply liquid under pressure through conduit 90 under the control of a reel drive regulating valve 99, to the reel motor 87. The pump 86 is reversible, depending upon the direction of travel of the vehicle, and has conduits 100 and 101 connected to its opposite sides and leading to conduits 102 and 102' respectively, the latter containing pairs of check valves 103, 104 and 105, 106. The conduits 102 and 102' are connected, beyond the check valves 105 and 106, to a pressure conduit 107 leading to the valve device 94, and conduits 102 and 102' are connected, beyond the check valves 103 and 104, to a return conduit 108 leading back to the tank 18.

Thus, from the foregoing it is evident that when the vehicle is traveling in either direction the pump 86 may supply liquid under pressure through the conduit 107 to the valve device 94 and thence to the reel motor 87 to drive the reel. When the vehicle is stationary the pump 80 may supply liquid under pressure to the reel motor 87 and to the other hydraulically operated elements of the vehicle including the clutch operating pistons. Thus, when the vehicle is stationary and the demands on the hydraulic system are relatively small, the pump 80 serves adequately to meet the demands, and when a large volume of hydraulic pressure is needed during traveling of the vehicle the pump 86, driven by the vehicle wheels, serves to supplement the liquid pressure supply. By such an arrangement the need for by-passing a large volume of liquid under pressure, with its inherent power losses, is avoided.

A branch conduit 110, containing a pressure reducing valve 111, leads from the conduit 90, between the check valve 93 and the relief valve 97, to valve devices 112, 113, 114 and 115, which are embodied in the control apparatus 19 and are operated by solenoids 116. The valve devices 112 and 113 are the forward and reverse control valves and are connected by conduits 117 and 118 respectively, to the forward and reverse clutches 79 and 78. The valve devices 114 and 115 control the selective operation of the speed controlling clutches 75, 76 and 77. The device 114 is connected by conduit 119 to the clutch 77 and the device 115 is connected by conduits 120 and 121 to the clutches 75 and 76 respectively. An operator controllable member 123, desirably a foot pedal located at the operator's station, is positionable to actuate switches 124 and 125 which control the energization of the solenoids 116 which in turn operate the valve devices 112 and 113 for the forward and reverse clutches 79 and 78 respectively, and a selector switch 126, having a shiftable operator 127, controls the energization of the solenoids 116 of the speed control valve devices 114 and 115. An electric line 131 leads from the positive side of the battery 16 to branch lines connected to the coils of the solenoids 116 of the valve devices 112, 113, 114 and 115, and lines 132 and 133 lead from the solenoids of the devices 112 and 113 to the forward switch 125 and reverse switch 124. An electric line 134 leads from the negative side of the battery, and a line 135 adjacent reverse switch 124 connects the negative line 134 with the forward and reverse switches. The reversing switches 125 and 124 are connected by lines 136 and 137 with the positive line 131, and have coils 152a and 153a positioned therein. The lines 138 and 139 lead from the selector switch 126 to the solenoids 116 which operate the valve devices 114 and 115. Thus, when the forward drive switch 125 is closed the solenoid 116 is energized to actuate the valve device 112 controlling the clutch 79, and the selector switch 126 may then be positioned to effect energization of the desired one of the solenoids 116 selectively to operate the valve devices 114 and 115 which control the low, intermediate or high speed clutches. When reverse drive at any one of the three speeds indicated is desired the reverse control switch 124 may be closed thereby to energize the solenoid which controls the valve device 113 thereby to apply the reverse drive clutch 78, while the forward drive clutch 79 is released due to the opening of the switch 125.

Now referring to the electrical control system for the electric driving motor 14, it will be observed that a line 143 (Fig. 13) is connected to the electric line 131 leading to the positive side of the battery and line 143 leads to the other terminals of the selector switch 126, and connected in this line are start and stop switches 144 and 145, a normally-open time delay relay 146 and a coil 147. A parallel line 148 leads from the line 143 between the starting switch 144 and the time delay relay 146 and is connected to the electric line 134 leading to the negative side of the battery, and this line 148 has connected therein a normally open switch 149a and a coil 149. A branch parallel line 150 leads from the line 148, between the normally open switch 149a and the coil 149. The other end of the line 150 is connected to the line 134 leading to the negative side of the battery. Line 150 has connected therein a coil 151 and forward and reverse normally closed switches 153 and 152, the latter associated with forward and reverse switches 155 and 154 respectively. Associated with the cable reel 11 are positive and negative lines 156 and 157 (Fig. 14) of the circuit for the motor 14, which have connected therein switches 158 and 159. The series field of the motor is designated 160, the shunt field is designated 161, and a starting resistance is designated 162. An accelerator switch 163 serves to cut in or out the starting resistance for the motor. The relationship of the various coils and switches is as follows: coil 147 positioned in line 143 upon energization closes normally open switch 163 (Figure 14) which permits by-passing of starting resistance 162. Coil 149 positioned in line 148 upon energization closes motor switches 158 and 159 (Fig. 14) and normally open switch 149a which is also positioned in line 148. Coil 151, positioned in line 150, upon energization closes normally open time delay relay 146. Coils 153a and 152a positioned in lines 136 and 137 respectively upon energization open normally closed switches 153 and 152.

The electrical control system operates as follows: to start motor 14 which may be connected in a 250 volt circuit, start switch 144, which may be connected in a separate 12 or 24 volt circuit, is closed. Upon closing start switch 144, low voltage current is conducted from battery 16 through conduit 143 and closed switches 145 and 144. Since time delay relay 146 is normally open, current is then conducted through line 148a to line 148 to energize coil 149. As stated, coil 149 upon energization closes motor switches 158 and 159 in the high voltage motor circuit (Fig. 14) thus energizing motor 14. However, since switch 163 is normally open the starting resistance 162 remains in the motor circuit. The energization of coil 149 also closes normally open switch 149a. Closing start switch also permits current to pass through line 150 and energize coil 151. The energization of coil 151 actuates normally open time delay relay 146 and after a predetermined time closes the same. The closing of time delay relay 146 completes the circuit through line 143 to coil 147. The energization of coil 147 closes normally open switch 163 in the motor circuit (Fig. 14) thus current bypasses the resistance 162 and motor 14 accelerates to normal speed.

To propel the vehicle in either direction treadle 123 is rotated to close either forward switch 125 or reverse switch 124. Assuming the motor 14 is energized and running at normal speed and it is desired to propel the vehicle in the forward direction, the operator by moving treadle 123 closes forward switch 125. The closing of forward switch 125 energizes coil 153ª in line 136. Coil 153ª by its energization opens corresponding switch 153 in line 150. The opening of switch 153 deenergizes coil 151 which opens time delay relay 146. The opening of time delay relay 146 deenergizes coil 147 which controls normally open switch 163 in the motor circuit (Fig. 14). The opening of switch 163 reinserts the resistance 162 in the motor circuit and decreases the speed of motor 14.

Simultaneous with the operation of the above circuit, the closing of forward switch 125 by the treadle 123 energizes coil 116 controlling the valve 112. The energization of coil 116 opens valve 112 and allows for the flow of pressurized fluid from conduit 110 through valve 112 to conduit 117, thence to forward clutch 79 to engage the same. As back pressure develops in conduit 117, a portion of the pressurized fluid flows through branch conduit 165 to the proper cylinder 166 and moves piston 167 to close switch 155. The closing of switch 155 completes a circuit to bypass open switch 153. The circuit through switch 155 energizes coil 151 which closes time delay relay 146 which energizes coil 147. The energization of coil 147 closes normally open switch 163 in the motor circuit (Fig. 14) to bypass resistance 162 so that motor 14 can accelerate to normal speed while propelling the vehicle in the forward direction. The sequence to shift to reverse operates in a similar manner. The opening of forward switch 125 and simultaneous closing of switch 124 will cause resistance 162 to be reinserted in the motor circuit (Fig. 14) during the clutch shifting operation. The above arrangement prevents forward and reverse clutches from engaging while the motor is operating at high speed, thus preventing excessive wear on the clutches and other structural members of the propelling means. In fact, with the above described circuit it is not possible to shift from forward to reverse while the motor 14 is operating at normal speed.

As shown in Fig. 13 a conduit 169 leads from the conduit 110 to a manual control valve device 170, and the conduit 43 of the hydraulically operated conveyor clutch 29 is connected to this valve device so that the conveyor may be started or stopped under the control of the operator.

As a result of this invention an improved mine haulage vehicle is provided which may be propelled and controlled in an improved manner. By the provision of the single prime mover and the selective multi-speed transmission, by which the traction wheels, the conveyor and the pressure generating means are driven, a vehicle which is extremely compact and simple in construction is made possible. The novel controls for the transmission together with the improved hydraulic and electrical systems and the improved motor controlling means, efficiency in operation and ease of control are attained. By the provision of the hydraulic system embodying the two relatively small pumps, power losses are substantially reduced and simplification and greater compactness are made possible. These and other advantages of the invention will be clearly apparent to those skilled in the art.

While there is in this application specifically described one form which the invention may assume in practice, it will be understood that this form of the same is shown for purposes of illustrations and that the invention may be modified and embodied in various other forms without departing from its spirit or the scope of the appended claims.

I claim:

1. In a vehicle of the character disclosed, an electric driving motor, propelling means for said vehicle, driving connections between said driving motor and said propelling means including control means for effecting forward and reverse propulsion of the vehicle, said control means including fluid operated forward and reverse clutches and control valve devices for said clutches for selectively operating the latter, forward and reverse switches, an electric circuit for said switches, said electric circuit including second control means adapted to control the speed of said electric motor, fluid operated actuators for said switches respectively, and means for supplying actuating fluid from said valve devices to said fluid operated actuators whereby whenever one of said clutches is engaged the corresponding switch is automatically closed thereby actuating said second control means to permit said electric motor to resume normal speed.

2. In a vehicle of the character disclosed, an electric driving motor having a starting resistance, propelling means for said vehicle, driving connections between said electric motor and said propelling means, said driving connections including reversing means adapted to change the direction of travel of said vehicle, electric control means including an electric circuit for controlling said reversing means, manually operable forward and reverse switches positioned in said circuit for controlling the direction of propulsion of the vehicle, and second electrical control means effective upon closing one of said switches to cut in said resistance and embodying means for automatically cutting out said resistance after a predetermined time while said switch remains closed.

3. In a vehicle of the character disclosed, the combination comprising an electric motor, a reversible transmission driven by said motor for propelling the vehicle either forwardly or rearwardly, control means for effecting reversal of the vehicle through said transmission, an electric circuit and electrical control means in said circuit for said motor including an electrical resistance and means for automatically cutting in said resistance when said control means is operated to effect reversal of said vehicle.

4. In a vehicle of the character disclosed, the combination comprising an electric motor for propelling the vehicle, a reversing gearing driven by said motor and including shiftable reversing clutches for effecting propulsion of the vehicle either forwardly or rearwardly, a first electric circuit including electrical clutch control means for effecting shifting of said clutches, and a second electric circuit including electrical control means for said motor, said last named control means having an electrical resistance associated therewith and operable to decrease the speed of said motor, and means associated with said clutch control means for cutting in said resistance when said clutches are operated to effect reversal of said vehicle.

5. In a vehicle of the character disclosed, the combination comprising an electric motor, reversible transmission means driven by said motor for propelling the vehicle either forwardly or rearwardly, said transmission means including reversing clutches having hydraulic operators, an electric circuit including electrically controlled valve means for controlling the supply of operating liquid to said clutch operators, hydraulically operated forward and reverse switches respectively said circuit associated with said clutch operators, and electrical control means for said motor including a resistance and control means controlled by said forward and reverse switches for automatically cutting in said resistance when said clutches are shifted to effect reversal.

6. In a vehicle of the character disclosed, a prime mover, propelling means for the vehicle, driving connections between said prime mover and said propelling means, said driving connections including reversing means adapted to change the direction of travel of said vehicle, directional control means operable to control said reversing means, speed control means associated with said directional control means and operable upon actuation by said directional control means to decrease the speed of said prime mover, and time delay means operable to restore said prime mover to normal speed a predetermined time after actuation of said directional control means.

7. In a control system for a vehicle the combination comprising a first electric circuit including an electric driving motor adapted to drive the propelling means of said vehicle and a starting resistor in series with said motor, a second circuit connected in parallel with said starting resistor, said second circuit including a normally open first switch operable when closed to complete said second circuit thereby bypassing said starting resistor in said first circuit, second switch means in said first circuit operable to control energization of said driving motor, a third electric circuit including a first coil operable upon energization to close said second switch means in said first circuit to energize said motor and a second coil operable upon energization to close said normally open first switch in said second circuit and third switch means in said third circuit operable to complete said third circuit, said third circuit including normally open time delay switch means between said first coil and said second coil operable to delay energization of said second coil for a predetermined time after energization of said first coil thereby delaying the closing of said normally open first switch in said second circuit until said driving motor accelerates to a predetermined speed, and connections in said third circuit enabling said first coil to be energized upon closing of said third switch means while said second coil remains deenergized to thereby complete said third circuit.

8. In a device of the character disclosed the combination comprising an electric motor, a mechanical reversing means driven by said motor, a driven means connected to said reversing means and operable to be driven in either forward or reverse direction, a control means for effecting reversal of said driven means through said reversing means, an electric circuit, and electrical control means in said circuit for said motor including an electrical resistance, and means for automatically cutting in said resistance when said control means is operated to effect reversal of said driven means.

References Cited in the file of this patent

UNITED STATES PATENTS

| | | |
|---|---|---|
| 719,182 | Browning et al. | Jan. 27, 1903 |
| 871,193 | Stull | Nov. 19, 1907 |
| 1,389,433 | Brophy | Aug. 30, 1921 |
| 2,321,098 | Morse | June 8, 1943 |
| 2,469,743 | Newton | May 10, 1949 |